United States Patent [19]

Hingorani

[11] 4,278,832

[45] Jul. 14, 1981

[54] METHOD AND MEANS FOR CLEANING THE GAS INSULATED ENVIRONMENT OF AN ELECTRICAL APPARATUS

[75] Inventor: Narain G. Hingorani, Los Altos Hills, Calif.

[73] Assignee: Electric Power Research Institute, Palo Alto, Calif.

[21] Appl. No.: 89,268

[22] Filed: Oct. 29, 1979

[51] Int. Cl.$^3$ .......................... H01B 17/36; B03C 3/70
[52] U.S. Cl. ..................................... 174/14 R; 55/85; 55/120
[58] Field of Search ................. 55/80, 82, 83, 85, 120, 55/385 R, 385 E; 174/14 R, 15 R; 134/11, 31

[56] References Cited

U.S. PATENT DOCUMENTS

| 1,938,841 | 12/1933 | Koch | 134/11 |
|---|---|---|---|
| 2,601,298 | 6/1952 | Keith | 55/80 |
| 2,718,279 | 9/1955 | Kraus | 55/85 |
| 4,079,522 | 3/1978 | Ham | 134/11 |
| 4,149,134 | 4/1979 | Kothmann et al. | 174/15 R |

*Primary Examiner*—David L. Lacey
*Attorney, Agent, or Firm*—Flehr, Hohbach, Test

[57] ABSTRACT

A sealed environment such as in a gas insulated electrical substation is cleaned by introducing a cleansing fluid in vapor form into the environment and condensing the vapor on surfaces within the environment. The condensed fluid is then removed and filtered to extract contaminants such as particulate matter. The cleansing fluid can be continuously introduced or periodically introduced during the cleaning process. By selecting a cleansing fluid with electrical insulating properties and a vaporization temperature lower than the condensation temperature of the gas insulation, electrical apparatus can be cleaned during normal operation of the apparatus.

11 Claims, 1 Drawing Figure

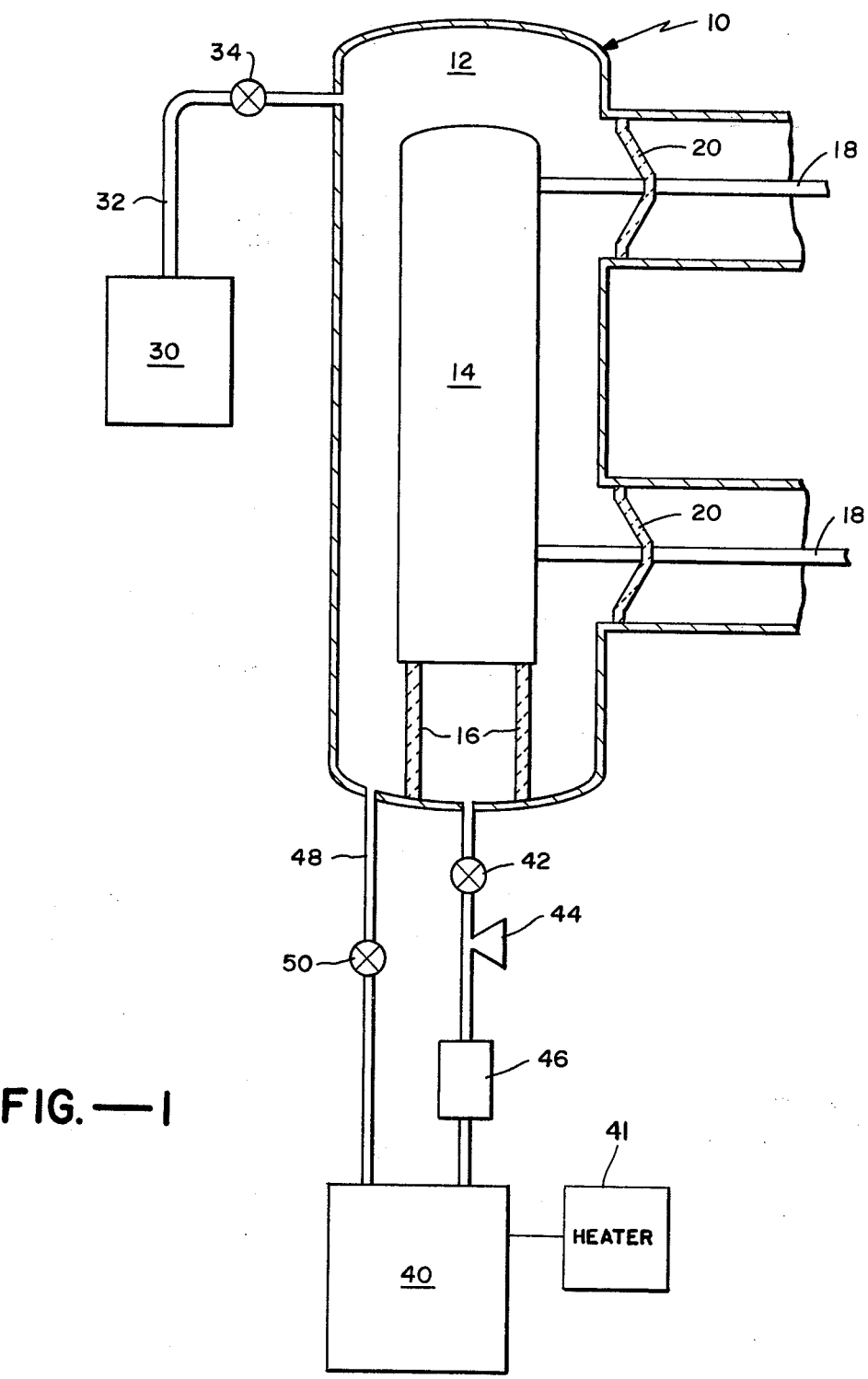
FIG.—1

METHOD AND MEANS FOR CLEANING THE GAS INSULATED ENVIRONMENT OF AN ELECTRICAL APPARATUS

This invention relates generally to sealed electrical apparatus which houses a very clean environment, and more particularly the invention relates to a method and means for cleaning the environment within a gas insulated substation apparatus used in electrical power system.

Electrical power system apparatus exists which requires a sealed, clean internal operating environment. For example, gas insulated electrical substation equipment including circuit breakers, switches, potential transformers, arresters, busbars and the like require a clean environment for reliable performance. Contamination resulting from dust or particulate matter introduced during assembly or formed during operation due to electrical arc or corona discharges can impair the reliable performance of such electrical equipment. Especially in the presence of small amounts of moisture, these contaminants affect the dielectric integrity of the gas insulation and insulator surfaces.

Accordingly, an object of the present invention is an improved method of cleaning a contained environment in the gas insulated substation equipment.

Another object of the invention is a method and means for cleaning gas insulated electrical substation equipment during operation of the equipment.

Briefly, the method of cleaning a contained environment in accordance with the present invention includes the steps of introducing into the environment a cleansing fluid in vapor form. The cleansing fluid is then condensed on the internal surfaces within the environment, and the condensed fluid is then removed from the environment. The cleansing fluid is selected to have good electrical insulating capability in liquid or vapor form.

The condensed fluid may then be filtered to remove particulate matter, and the filtered fluid can then be reintroduced into the environment in vapor form to continue the cleaning process. In practicing the invention the cleansing fluid may be continuously introduced into the environment during the cleaning process, or alternatively, the cleaning fluid may be periodically introduced into the environment during the cleaning process.

Structure in practicing the invention includes means for introducing the cleansing fluid into the environment in vapor form, and means for removing the condensed fluid from the environment. Where the cleansing fluid is periodically introduced into the environment during the cleansing process, the means for receiving the condensed fluid may also serve to introduce the cleansing fluid in vapor form into the environment.

In particular applications in gas insulated electrical apparatus, the environment would include a second fluid or mixture of fluids in vapor form which has a condensation temperature lower than the vaporization temperature of the cleansing fluid whereby the cleansing fluid can be introduced in vapor form, condensed, and removed from the sealed environment without affecting the second fluid vapor within the environment.

The invention and objects and features thereof will be more readily apparent from the following detailed description and appended claims when taken with the drawing which illustrates a section view of gas insulated electrical apparatus and apparatus for cleaning the enclosed environment in accordance with one embodiment of the present invention.

Referring now to the drawing, a sealed apparatus 10 defines a contained environment 12 in which electrical components such as a circuit interrupter 14 is insulatively mounted by standoffs 16. The interrupter 14 is connected through conductors 18 and insulators 20 through the housing of apparatus 10 to other similar apparatus and/or an external power system. There, of course, may be numerous other ways that the apparatus is housed in its container and connected to the other apparatus in the system, and the drawing is for illustration only.

Conventionally, the sealed environment is filled with an electrically insulating gas such as sulphur hexafluoride ($SF_6$) or gas mixtures ($SF_6$ and nitrogen). As above indicated, the presence of any contaminants in the sealed environment 12 can affect the reliable performance of the electrical apparatus. To remove particulate matter from the environment 12, in accordance with one embodiment of the present invention, a container 30 of cleansing fluid is connected to the enclosed environment 12 by means of gas line 32 having a valve 34 therein. In gas insulated electrical equipment, the cleansing fluid is preferably a fluorocarbon such as Freon F113 or carbon tetrachloride ($C_2CL_4$) which are good electrical insulators in liquid and vapor form. At the bottom of apparatus 10 is a second container 40 which is connected to environment 12 by means of a first line including a valve 42, a viewing window 44, and a filter 46. A second line 48 including valve 50 also connects container 40 with the environment 12.

During periodic maintenance of the equipment, the $SF_6$ gas is pumped from environment 12, and then the cleansing fluid is introduced into the environment in vapor form. The temperature of the environment is maintained below the condensation point of the cleansing fluid, and the vapor condenses on the internal surfaces within environment 12. The condensed fluid along with entrapped particulate matter flows to the bottom of housing 10 and through filter 46 to the receiving reservoir 40. Filter 46 removes the particulate matter, and the cleanliness of the condensed fluid can be determined through the viewing window 44. Thus, the cleaning process can be continued until the condensed cleansing fluid as viewed through window 44 is clean. Viewing window may be replaced or supplemented by means of measurement of electrical resistivity of the fluid which is lowered by the contaminants.

During the cleaning process, the cleaning fluid from container 30 may be continuously introduced into environment 12, with the condensed fluid received by container 40. Alternatively, the condensed fluid in container 40 may be periodically reintroduced into environment 12 by closing valve 42 and opening valve 50. By heating container 40 with heater 41 or through ultrasonic agitation of the contained fluid, the filtered fluid is reintroduced in vapor form through line 48 into environment 12 while the particulate matter remains in container 40. Thereafter, valve 50 is closed, the cleansing vapor in environment 12 is condensed, valve 42 is reopened, and the filtered liquid is again received in container 40. To facilitate the condensing of the cleansing vapor, device 12 can be chilled to provide rapid condensation of the vapor in the vessel.

Advantageously, the cleansing process can be effected during normal operation of the electrical apparatus by choosing a cleansing fluid having good electrical properties and which has a vaporization temperature range higher than the vaporization temperature range of the insulating gas and normal operating temperature range when introduced in the common vessel 10. For example, at 1 atmosphere pressure $SF_6$ gas condenses at approximately $-90°$ C., while at 1 atmosphere Freon F113 vaporizes at approximately 50° C. Therefore within normal $SF_6$ pressure of 40–80 psi and temperature range of $-20°$ C. to 40° C., most of the F113 introduced in the device 10 will condense and be collected while the gas insulation remains in gaseous form. Only a minute amount of F113 will remain in vapor form which is not hazardous since F113 is electrically stronger than $SF_6$.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of cleaning the environment of a gas insulated electrical apparatus to remove contaminants in said environment comprising the steps of:
   introducing into said environment a cleansing fluid in vapor form,
   condensing said fluid on internal surfaces of said apparatus within said environment and thereby capturing contaminants, and
   removing said condensed fluid and contaminants from said environment.

2. The method as defined in claim 1 and further including the steps of filtering said condensed fluid to remove said contaminants, and
   reintroducing said filtered fluid into said apparatus in vapor form.

3. The method as defined by claim 1 wherein said cleansing fluid is continuously introduced into said apparatus during the cleaning process.

4. The method as defined by claim 1 wherein said cleansing fluid is periodically introduced into said apparatus during the cleaning process.

5. The method as defined by claim 4 wherein said condensed fluid is received in a container means, and said fluid is periodically re-introduced into said apparatus by heating said container means to vaporize the condensed fluid.

6. The method as defined in claim 1 wherein the gas which insulates said gas insulated apparatus comprises a second fluid in vapor form which has a condensation temperature lower than the vaporization temperature of said cleaning fluid, and said step of condensing said fluid includes lowering the temperature of said apparatus to level where said cleansing fluid condenses while said second fluid remains a vapor.

7. The method as defined by claim 6 wherein said cleansing fluid comprises a fluorocarbon and said second fluid comprises sulphurhexafluoride.

8. In sealed gas insulated electrical apparatus, means for cleaning the enclosed gas insulating environment of said apparatus comprising means for introducing into said environment a cleansing fluid in vapor form, and means for removing said cleansing fluid from said environment after said cleansing fluid condenses in said environment.

9. In a sealed gas insulated electrical apparatus as defined by claim 8 and further including means for filtering said condensed fluid to remove contaminants.

10. In a sealed gas insulated electrical apparatus as defined by claim 9 wherein said means for removing said condensed fluid from said environment includes means for periodically vaporizing said condensed fluid and reintroducing said vapor into said environment.

11. In a sealed gas insulated electrical apparatus as defined by claim 8 wherein said gas insulating environment comprises sulphurhexafluoride gas, and said cleansing fluid comprises a fluorocarbon.

* * * * *